(12) United States Patent
Sasaki et al.

(10) Patent No.: US 6,804,952 B2
(45) Date of Patent: Oct. 19, 2004

(54) CATALYST WARM UP CONTROL FOR DIESEL ENGINE

(75) Inventors: Shizuo Sasaki, Numazu (JP); Kouji Yoshizaki, Numazu (JP); Nobuki Kobayashi, Toyota (JP); Yoshiki Hashimoto, Suntou-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/369,629

(22) Filed: Feb. 21, 2003

(65) Prior Publication Data

US 2004/0163378 A1 Aug. 26, 2004

(51) Int. Cl.[7] .................................. F01N 3/00
(52) U.S. Cl. ..................... 60/284; 60/285; 60/274; 60/286
(58) Field of Search .................. 60/274, 284, 285, 60/286; 123/299, 300

(56) References Cited

U.S. PATENT DOCUMENTS

| | | | | |
|---|---|---|---|---|
| 5,404,719 A | * | 4/1995 | Araki et al. | 60/276 |
| 5,642,705 A | * | 7/1997 | Morikawa et al. | 123/300 |
| 5,839,275 A | * | 11/1998 | Hirota et al. | 60/285 |
| 6,131,388 A | | 10/2000 | Sasaki et al. | |
| 6,240,723 B1 | | 6/2001 | Ito et al. | |
| 6,513,322 B2 | * | 2/2003 | Ohuchi et al. | 60/285 |
| 6,536,209 B2 | * | 3/2003 | Fluga et al. | 60/284 |
| 2002/0124554 A1 | | 9/2002 | Majima | 60/284 |

FOREIGN PATENT DOCUMENTS

| | | |
|---|---|---|
| EP | 1 138 900 A2 | 10/2001 |
| EP | 1 167 727 A2 | 1/2002 |
| JP | A 5-44448 | 2/1993 |
| JP | A 6/207545 | 7/1994 |
| JP | A 10-274086 | 10/1998 |
| JP | A 10-274087 | 10/1998 |
| JP | A 11-30135 | 2/1999 |
| JP | A 11-229973 | 8/1999 |
| WO | WO 02/073018 A1 | 9/2002 |

* cited by examiner

Primary Examiner—Thomas Denion
Assistant Examiner—Diem Tran
(74) Attorney, Agent, or Firm—Oliff & Berridge, PLC

(57) ABSTRACT

Diesel engine is operated in a first warm-up mode in an early warm-up period after startup so as to accelerate activation of the catalyst, and then in a second warm-up mode in a late warm-up period after the early warm-up period so as to maintain activity of the catalyst. The first warm-up mode provides more energy to the catalyst with exhaust gases than the normal operation mode of the diesel engine. The second warm-up mode provides exhaust gases of higher temperature to the catalyst than the normal operation mode.

34 Claims, 15 Drawing Sheets

Effect on catalyst warm up of adjusting VNT and intake throttle

CATALYST WARM UP CONTROL FOR DIESEL ENGINE

BACKGROUND OF THE INVENTION

1. Field of the Invention

The present invention relates to a catalyst warm-up technique for a diesel engine.

2. Description of the Related Art

Catalysts are widely employed in diesel engines in order to purify exhaust gases. Such catalysts typically do not exhibit purifying activity until warmed to above a predetermined temperature. Accordingly, a warm-up operation to raise the temperature of the catalyst bed is typically performed when starting up a diesel engine.

Diesel engine catalyst warm-up procedures proposed to date include that disclosed in JP11-229973A. This technique involves providing a second, separate EGR passage for warming the catalyst, in addition to the usual first EGR passage. The first EGR passage recirculates exhaust gases to the air intake from a point upstream from the catalyst, while the second EGR passage recirculates exhaust gases to the air intake from a point downstream from the catalyst. Where the catalyst is at low temperature, recirculation of exhaust gases to the air intake from a point downstream from the catalyst via the second EGR passage causes all the exhaust gases to pass through the catalyst, so that catalyst temperature rises more quickly.

Normal operation immediately after the catalyst warm-up operation, however, may cool the catalyst with a substantial amount of exhaust gas flow, thereby deactivating the catalyst. According, there has existed a need for a technique to accelerate catalyst warm up and maintain its activity.

SUMMARY OF THE INVENTION

The present invention is directed to solving this problem, and has as an object to provide a technique for accelerating catalyst warm up and maintaining its activity.

The present invention pertains to a diesel engine comprising a combustion chamber, a fuel injection device for injecting fuel into the combustion chamber, a catalyst for purifying exhaust gases from the combustion chamber, and a controller for controlling a plurality of devices of the diesel engine including the fuel injection device. The controller is configured to perform operation in a first warm-up mode in an early warm-up period after startup of the diesel engine, and to perform operation in a second warm-up mode in a late warm-up period after the early warm-up period, so as to accelerate and maintain activation of the catalyst. The first warm-up mode is configured to provide more energy to the catalyst with exhaust gases than a normal operation mode of the diesel engine, which is performed after the late warm-up period. The second warm-up mode is configured to provide exhaust gases of higher temperature to the catalyst than the normal operation mode.

In an embodiment of the present invention, the controller is configured to perform the following three operations in the first warm-up mode: (i) controlling the fuel injection device such that fuel injection is subdivided into pilot injection and main injection; (ii) setting an injection charge proportion for the pilot injection to a level higher than an injection charge proportion for the pilot injection in the normal operation mode, and (iii) retarding an injection timing for the main injection relative to an injection timing for the main injection in the normal operation mode.

The present invention is also directed to an operation method of a diesel engine including a combustion chamber, a fuel injection device for injecting fuel into the combustion chamber, and a catalyst for purifying exhaust gases from the combustion chamber. The method comprises the steps of: performing engine operation in a first warm-up mode in an early warm-up period after startup of the diesel engine, so as to accelerate activation of the catalyst; and performing engine operation in a second warm-up mode in a late warm-up period after the early warm-up period, so as to maintain activity of the catalyst. The first warm-up mode is configured to provide more energy to the catalyst with exhaust gases than a normal operation mode of the diesel engine, wherein the normal operation mode is performed after the late warm-up period. The second warm-up mode is configured to provide exhaust gases of higher temperature to the catalyst than the normal operation mode.

Another aspect of the present invention pertains to a diesel engine comprising: a combustion chamber; a fuel injection device for injecting fuel into the combustion chamber; a catalyst for purifying exhaust gases from the combustion chamber; and a controller for controlling the fuel injection device, wherein the controller performs the following operations: (i) controlling the fuel injection device such that during a warm-up period of the catalyst, fuel injection is subdivided into pilot injection and main injection; (ii) setting an injection charge proportion for the pilot injection during the warm-up period to a level higher than an injection charge proportion for the pilot injection during a normal operation of the diesel engine, and (iii) retarding an injection timing for the main injection during the warm-up period relative to an injection timing for the main injection during the normal operation of the diesel engine.

The present invention may be embodied in various forms such as a diesel engine (a compression ignition internal combustion engine), a catalyst warm-up control device for a diesel engine, a operation method for the engine, a vehicle or moving body employing a diesel engine, and so on.

These and other objects, features, aspects, and advantages of the present invention will become more apparent from the following detailed description of the preferred embodiments with the accompanying drawings.

DESCRIPTION OF THE PREFERRED EMBODIMENT

Figure 1:
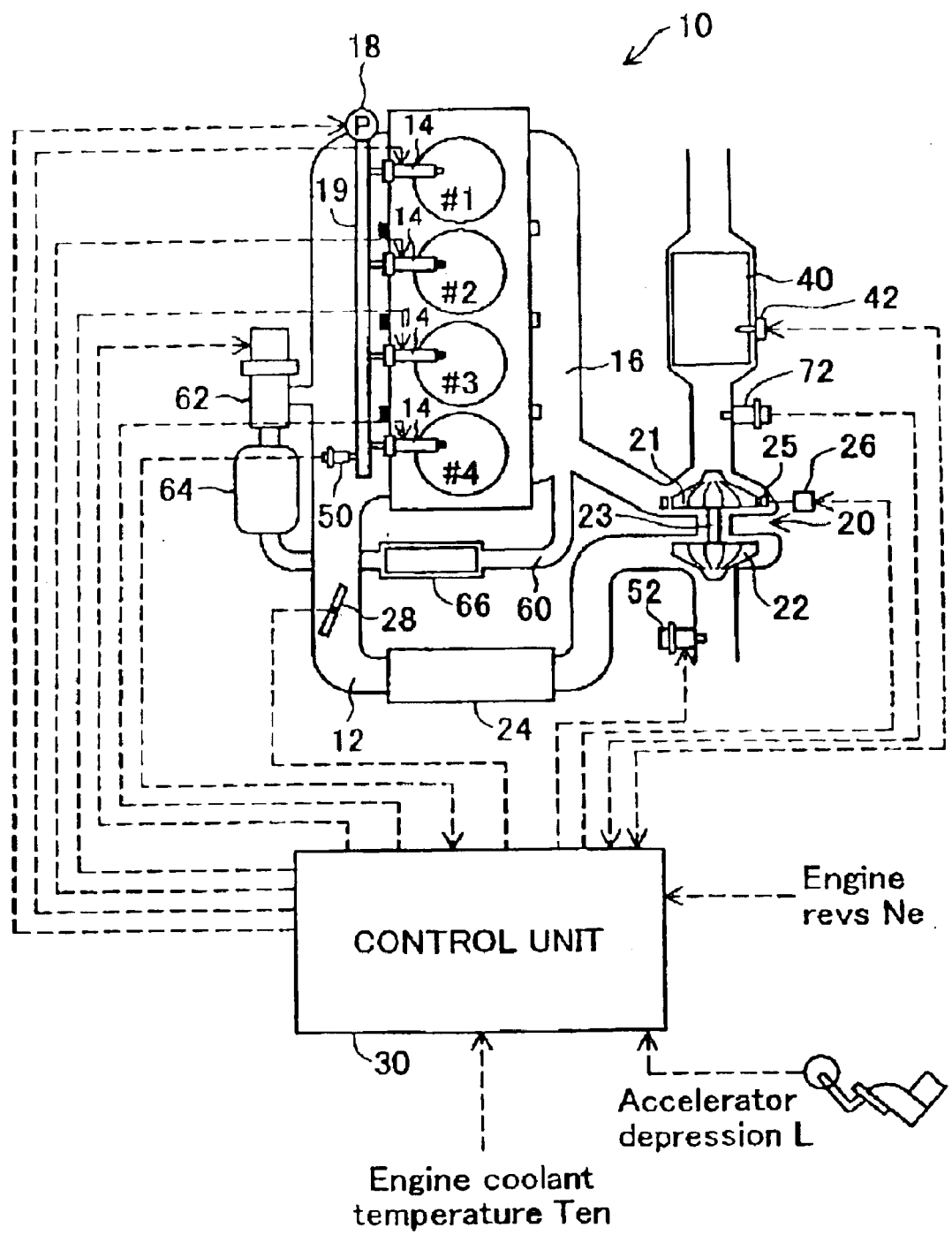
FIG. 1 is an illustrative diagram showing a simplified arrangement of a diesel engine 10 according to an embodiment of the invention.

The embodiments of the invention shall be described in the order indicated hereinbelow:

A. Overview of Device Arrangement and Operation;
B. Conceptual Approach to Accelerating Catalyst Warm up and Maintaining Catalyst Activity at Engine Startup;
C. Warm up Control Embodiment 1;
D. Warm up Control Embodiment 2;
E. Warm up Control Embodiment 3;
F. Warm up Control Embodiment 4;
G. Variations A. Overview of Device Arrangement and Operation:

FIG. 1 is an illustrative diagram showing a simplified arrangement of a diesel engine 10 according to an embodiment of the present invention. The diesel engine is a so-called four cylinder engine having four combustion chambers #1–#4. Each combustion chamber is supplied with air via an air intake line 12. The fuel injection device comprises a fuel pump 18, a common rail 19, and fuel injection valves 14. Fuel is pressurized by fuel pump 18 and distributed to the fuel injection valves 14 of the combustion chambers via common rail 19. Fuel injection valves 14 are controlled by a control unit 30, to inject appropriate amounts of fuel into the combustion chambers under appropriate injection timing. Exhaust gases produced by combustion are expelled through an exhaust line 16. The diesel engine 10 of this embodiment is used as a motor for generating drive power for a vehicle.

Engine 10 also comprises a turbocharger 20. Turbocharger 20 comprises a turbine 21 disposed in the exhaust line 16; a compressor 22 disposed within the air intake line 12; a shaft 23 connecting these two components; and an actuator 26 for regulating the size of the opening of the inlet nozzle 25 of turbine 21. As combusted exhaust gases expelled from the combustion chambers spin the turbine 21 of the turbocharger 20, the compressor 22 rotates via the shaft 23, compressing the air and supplying it to the combustion chambers. Turbocharger 20 is a variable capacity turbocharger wherein the driving pressure of the air can be varied by means of actuator 26, and is typically known as a variable nozzle turbocharger (VNT) or variable geometry turbocharger.

An air cleaner (not shown) is disposed on the upstream end of compressor 22. Compressor 22 compresses air drawn in via the air cleaner, and supplies it to the combustion chambers. The air compressed by compressor 22 is chilled by an intercooler 24 before being supplied to the combustion chambers. A throttle valve 28 (air intake throttle valve) is disposed downstream from intercooler 24.

Main catalyst 40 is disposed within the exhaust line 16 downstream from turbine 21. Main catalyst 40 consists for example of an NOx occluding/reducing type catalyst that can remove both particulates, such as soot and SOF (soluble organic fraction), and NOx from combustion exhaust gases.

NOx occluding/reducing type catalysts store NOx when the air-fuel ratio becomes higher than the theoretical air-fuel ratio (i.e. a so-called lean mix) as the combustion reaction proceeds in the combustion chamber. Where the air-fuel ratio is lower than the theoretical air-fuel ratio (i.e. a so-called rich mix) or equal to the theoretical air-fuel ratio (i.e. so-called stoichiometry), the stored NOx are released. By this operation, NOx present in combustion exhaust gases are purified. NOx occluding/reducing type catalysts also have oxidation catalyst activity. Combustion exhaust gases are purified by oxidation on the catalyst of soot and SOF present in the combustion exhaust gases.

Exhaust line 16 and air intake line 12 are connected by an EGR line 60 so that some of the combustion exhaust gases may be recirculated to the air intake line 12 via the EGR line 60. The flow of exhaust gases recirculated to air intake line 12 is controlled by regulating the opening of an EGR valve 62 and the throttle valve 28. Additionally, an EGR cooler 64 is disposed in the EGR line so that combustion exhaust gases are cooled by the EGR cooler 64 prior to being introduced into the air intake line 12. An EGR catalyst 66 is disposed upstream from the EGR cooler 64. EGR catalyst 66 has an oxidation catalyst which oxidizes and removes particulates (such as SOF) present in combustion exhaust gases. The EGR catalyst 66 is optional.

Control unit 30 receives measurements from sensors provided for sensing engine revs Ne, accelerator depression L, and engine coolant temperature Ten, and in response to these measurements controls the fuel pump 18, fuel injection valves 14, EGR valve 62, throttle valve 28 and so on. Various other sensors are provided as well. For example, a pressure sensor 50 for sensing fuel pressure is provided to common rail 19. An air flow meter 52 for sensing intake air flow is provided to the air intake line 12 upstream from compressor 22. Exhaust line 16 is provided with an air-fuel ratio sensor 72 for sensing the air-fuel ratio. Main catalyst 40 is provided with a temperature sensor 42 for sensing catalyst bed temperature.

Figure 2:
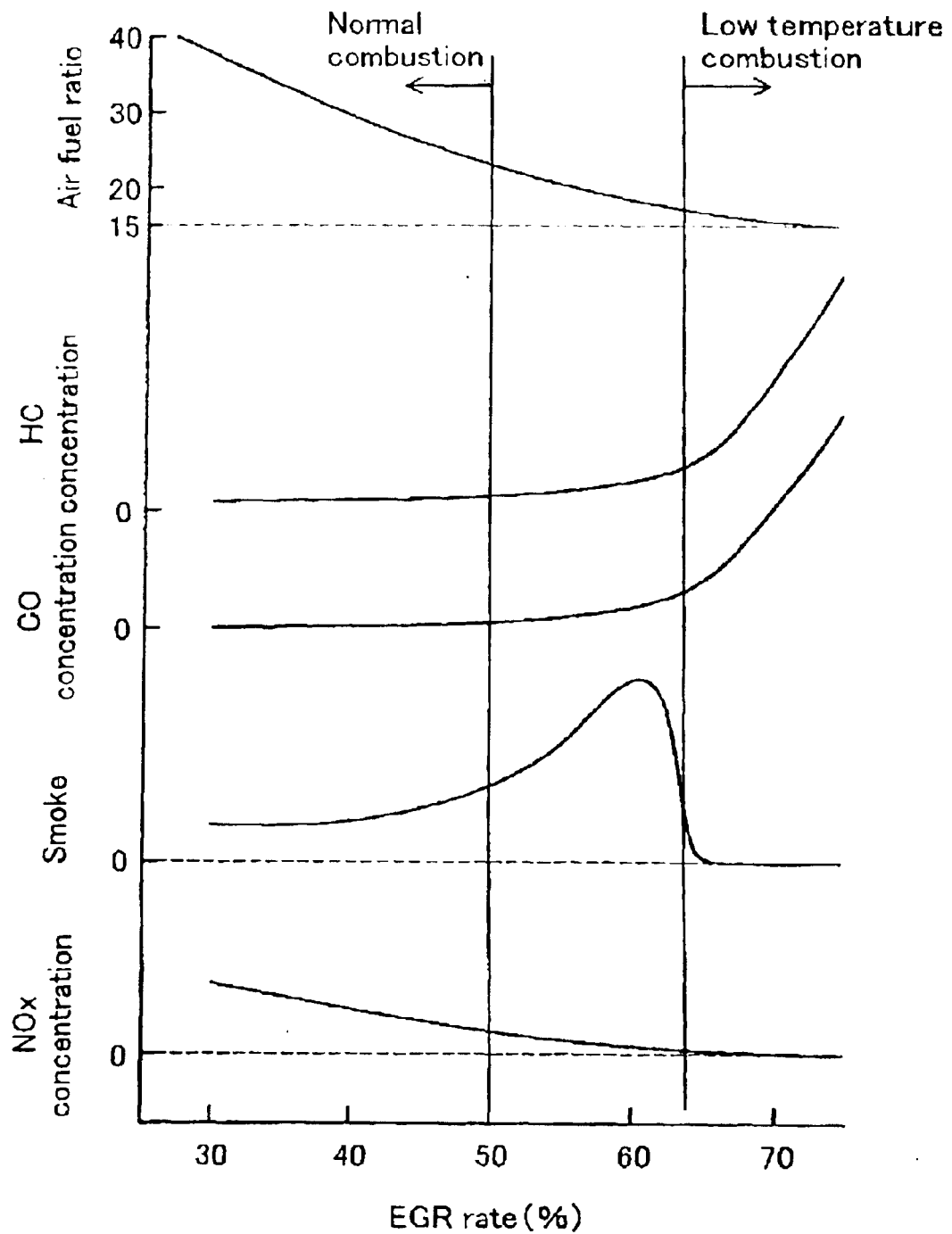
FIG. 2 is a conceptual diagram showing change in concentration of several substances in combustion exhaust gases as the EGR rate is gradually increased.

FIG. 2 is a conceptual diagram showing change in NOx concentration, smoke, CO (carbon monoxide) concentration, and HC (uncombusted hydrocarbon compounds) concentration in combustion exhaust gas as the EGR rate ([EGR gas flow]/[EGR gas flow+intake air flow]) increases. The fuel injection timing is fixed in the examples of FIG. 2. Here, "smoke" is an indicator representing concentration of suspended fine carbon particulates, such as soot, present in exhaust gases, and is measured by a dedicated measuring device called a smoke meter. Exhaust gases completely free of suspended fine carbon particulates such as soot have a smoke value of 0, with smoke value increasing at progressively higher concentrations of particulates. In the example illustrated in FIG. 2, the smoke value begins to rise once the EGR rate goes above 40%, but with further increase in the EGR rate, to above 60%, substantially no smoke is produced. NOx concentration declines with increasing EGR rate. That is, a sufficiently high EGR rate results in NOx emissions dropping to close to zero (at most about 10 ppm), with smoke at close to zero as well. Herein, a combustion mode wherein EGR rate is set to 60% or above to reduce smoke and NOx concentrations shall be referred to as "low temperature combustion." Normal mode, conducted at a lower EGR rate than with low temperature combustion, shall be termed "normal combustion." In normal combustion the EGR rate is kept to 50% or lower. The designation "low temperature combustion" refers to the fact that in this combustion mode, localized combustion temperature within combustion chambers is kept to significantly lower levels than normal combustion temperature due to the action of the EGR gases. Lower localized combustion temperatures are known to tend to reduce smoke and NOx emissions. Low temperature combustion is described in detail in U.S. Pat. No. 6,131,388, the disclosure of which is incorporated herein by reference for all purposes.

As shown in the uppermost portion of FIG. 2, the air-fuel ratio decreases with increasing EGR rate. For a given total intake flow (the sum of intake air flow and EGR gas flow) supplied to a combustion chamber in a single intake cycle, greater EGR gas flow means smaller air intake flow. Since the oxygen concentration in EGR gases is typically lower than that in ambient air, a higher EGR gas flow, that is, a higher EGR rate, means that the air-fuel ratio is closer to the rich side. As shown in FIG. 2, the EGR rate for low temperature combustion is higher than that for normal combustion, and the air-fuel ratio will accordingly be shifted towards the rich side relative to normal combustion.

In a diesel engine, combustion is typically brought about at a lean air-fuel ratio. Even where EGR is implemented, the air-fuel ratio will be kept lean during normal combustion. By increasing EGR gas flow further, combustion can be brought about under conditions of an air-fuel ratio equivalent to the theoretical air-fuel ratio (stoichiometry). While strictly speaking the air-fuel ratio is dependent on fuel formulation, for virtually all fuels the theoretical air-fuel ratio is a value close to 14.7–14.8. Increasing the EGR gas flow beyond the condition of the theoretical air-fuel ratio gives a rich air-fuel ratio.

Figure 3:
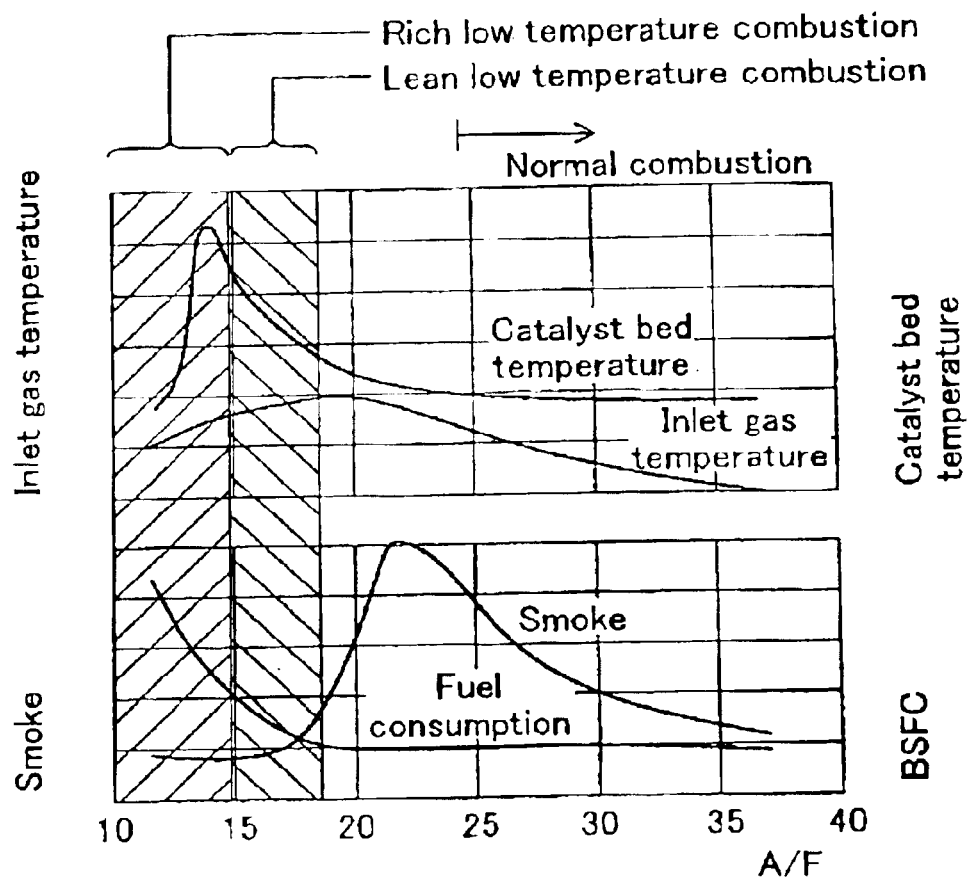
FIG. 3 is a conceptual diagram showing change combustion exhaust gas smoke content and fuel consumption occurring with change in air-fuel ratio (A/F).

FIG. 3 is a conceptual diagram showing change in various combustion-related characteristics (combustion exhaust gas smoke content, diesel engine fuel consumption, catalyst bed temperature, and catalyst inlet gas temperature) occurring with change in the air-fuel ratio (A/F) by 0 manipulating the EGR rate. Catalyst bed temperature and catalyst inlet gas temperature here refer respectively to catalyst bed temperature measured at the main catalyst 40 in FIG. 1, and the temperature of the combustion exhaust gas inflowing to the catalyst 40. As shown in FIG. 3, low temperature combustion is classified as either lean low temperature combustion conducted on the lean side of the theoretical air-fuel ratio, and rich low temperature combustion conducted on the rich side of the theoretical air-fuel ratio.

Lean low temperature combustion affords sufficiently low levels of smoke, as well as fuel consumption good enough to be acceptable even in comparison with normal combustion. As shown in FIG. 2, with lean low temperature combustion, HC and CO concentrations in combustion exhaust gases are higher than with normal combustion. However, low temperature combustion tends to produce less combustion exhaust gases and higher combustion exhaust gas temperatures than normal combustion. Thus, catalyst bed temperature can be maintained at a higher level with low temperature combustion (See FIG. 3). By holding the catalyst bed at high temperature in this way, it is fairly simple to reduce HC and CO concentrations in exhaust gases expelled to the outside. In this way, lean low temperature combustion, through combination with main catalyst 40, is an excellent combustion mode affording emission of extremely clean exhaust gases.

As noted, low temperature combustion represents a combustion mode in which combustion temperature is brought down by recirculating a large flow of EGR gases. Accordingly, low temperature combustion is substantially limited to use at low loads. That is, to operate the engine at a higher load, it is necessary to increase the fuel injection amount and the air intake flow. Since, as a general rule, the total value of the air flow drawn into a combustion chamber during one intake cycle and the recirculated flow of exhaust gases to the intake side does not change, increasing the air flow will have the effect of reducing the recirculated flow of exhaust gases to a corresponding extent. Thus, if load is high, it will not be possible to maintain the EGR rate at a level high enough for low temperature combustion to occur. Accordingly, normal combustion is carried out at medium and high loads. The NOx formed by normal combustion at medium and high loads are occluded by the main catalyst 40, which is an NOx occluding/reducing type catalyst. The occluded NOx are reduced by HC and CO emitted during low temperature combustion at low load.

Figure 4:
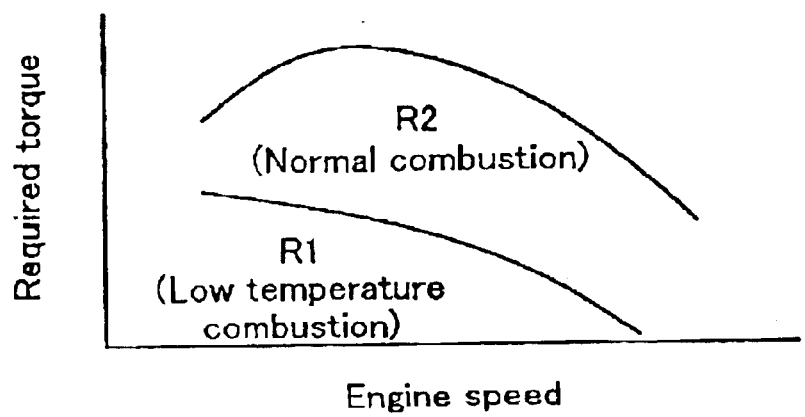
FIG. 4 is a graph showing operation zones for low temperature combustion and normal combustion.

FIG. 4 is a graph showing operation zones for low temperature combustion and normal combustion. As shown in FIG. 4, in zone R1, where engine operating condition is relatively low output, lean low temperature combustion may be carried out, whereas in the zone R2 of relatively high output, normal combustion is carried out. In zone R1, however, normal combustion may be also carried out. In other words, either low temperature combustion or normal combustion is selected in zone R1. More specifically, maps indicating an exhaust gas air-fuel ratio control target are created with engine speed and required engine torque as parameters, and are stored respectively as a map for low temperature combustion and a map for normal combustion, and the air-fuel ratio sensed by the air-fuel ratio sensor 72 installed in the exhaust line 16 is controlled to the target air-fuel ratio according to the map suitable for the selected combustion mode. The maps are stored in ROM (not shown) in the control unit 30.

As shown in FIG. 3, rich low temperature combustion represents a combustion mode with poor fuel consumption, and as such is not normally used; however, as the mode allows catalyst bed temperature to be increased as shown in FIG. 3, it is commonly used for very brief period to regenerate the catalyst. That is, with continued normal combustion, catalyst bed temperature gradually declines due to the low combustion exhaust gas temperature, which poses the risk of a decline in catalyst activity; in such instances, conducting rich low temperature combustion for a brief period will increase catalyst bed temperature and restore catalyst activity.

B. Conceptual Approach to Accelerating Catalyst Warm up and Maintaining Catalyst Activity at Engine Startup:

Warm up of catalyst 40 is accomplished by the heat of the exhaust gases passing through catalyst 40. Using a round tube turbulent flow model to model the flow of exhaust gases through catalyst 40, heat transfer Q from exhaust gases to catalyst 40 is given by Equation (1).

$$Q = C1 \cdot Re^{0.8} \cdot Pr^{1/3} \cdot (Tg \cdot Tc) = C2 \cdot V^{0.8} \cdot (Tg \cdot Tc) \tag{1}$$

where C1 and C2 are constants, Re is the Reynolds number, Pr is the Prandtl number, Tg is exhaust gas temperature, Tc is catalyst temperature, and V is exhaust gas flow velocity. The Prandtl number is determined simply by physical values of the fluid, and is represented by constant C2.

The Reynolds number Re is proportional to exhaust gas flow velocity V.

The higher the heat transfer Q, the faster the catalyst 40 warms up. Thus, the following two methods could be used to accelerate catalyst warm up.

(a) Raise exhaust gas temperature Tg.

(b) Increase exhaust gas flow velocity V.

In the embodiments described hereinbelow, at least one of these two methods is employed to accelerate warm-up of the catalyst. After the catalyst reaches the activation temperature, activity maintaining operation is carried out for some time period. The activity maintaining operation employs a method to raise exhaust gas temperature Tg.

Figure 5:
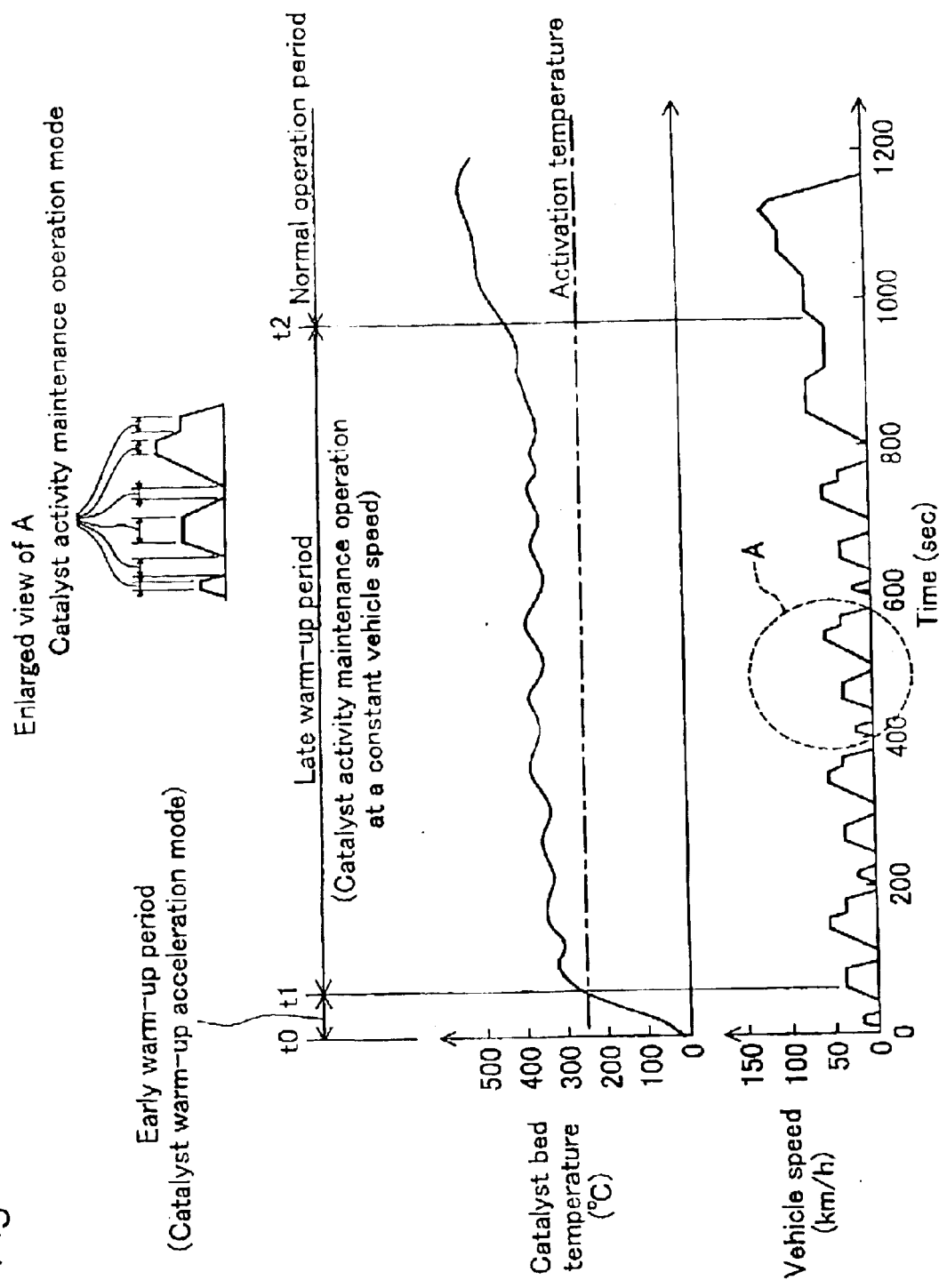
FIG. 5 illustrate a concept of catalyst warm up operation.

FIG. 5 illustrates a concept of catalyst warm up operation in the embodiment. The horizontal axis in FIG. 5 plots time elapsed from startup (cold start), and the vertical axis plots, in order from the top, catalyst bed temperature and vehicle speed. The warm-up period is divided into an early warm-up period (early warm up phase) and a late warm-up period (late warm up phase). The change of the vehicle speed in this example conforms to a prescribed vehicle performance test pattern.

The early warm-up period t0–t1 is intended for raising the catalyst bed temperature from the ambient temperature to the activation temperature (about 250° C. for example). During the early warm-up period, a catalyst warm-up acceleration mode (described later) is carried out to raise the catalyst bed temperature to the activation temperature at the end of the early warm-up period. The late warm-up period t1–t2 is indented to maintain catalyst activity. During the late warm-up period, a catalyst activity maintenance operation (described later) is carried out under certain conditions including a condition that a requested load for the engine is lower than a predetermined value. In the example of FIG. 5, as shown in the upper portion of the figure, the catalyst activity maintaining operation is carried out when the requested load for the engine is low and its revolution is approximately constant, more specifically, during constant speed runs and idling.

Normal engine operation is carried out after the late warm-up period. At the end of the late warm-up period, the engine coolant and the exhaust line are well heated up as well as the catalyst bed temperature. Accordingly, the catalyst temperature will be maintained above the activation temperature even with normal engine operation and without the need for the catalyst activity acceleration operation or the catalyst activity maintaining operation. In this specification, the mode of engine operation that is normally carried out after the late warm-up period is referred to as "normal operation mode." The total of the early warm-up period and the late warm-up period may be referred to as "warm-up period."

The catalyst activity acceleration mode in the early warm-up period may be implemented by various engine operation modes in which the energy of the exhaust gas flowing through the catalyst is higher than that in the normal operation mode after the warm-up period. Here, the phrase "higher than that in the normal operation mode" means "higher than that in the normal operation mode under the conditions of approximately the same engine load and the same engine revolution." Actual example of the catalyst activity acceleration mode will be described later in detail. The catalyst activity maintenance mode in the late warm-up period may be implemented by various engine operation modes in which the temperature of the exhaust gas flowing through the catalyst is higher than that in the normal operation mode after the warm-up period. For example, the low temperature combustion described with reference to FIGS. 2 and 3 may be employed as the catalyst activity maintenance mode.

Increase of the exhaust gas temperature in the catalyst activity maintenance mode may be generally attained by reducing an air ratio or an air-fuel ratio from that of the normal operation mode. Preferably the catalyst activity maintenance mode has a lower air ratio than both the normal operation mode and the catalyst warm up acceleration mode. This is because higher air ratio will reduce the exhaust gas temperature with large amount of air while lower air ratio will increase the exhaust gas temperature on the contrary. Since the low temperature combustion employs a low air-fuel ratio and attains higher exhaust temperatures than the normal operation mode, as shown in FIG. 3, the low temperature combustion may be suitable for the catalyst activity maintenance monde. Alternatively, engine operation modes other than the low temperature combustion may be employed as the catalyst activity maintenance mode while reducing the air ratio than the normal operation mode after the warm-up period, so as to raise the exhaust gas temperature. Reduction of air ratio is attained by a method of decreasing the throttle valve 28 opening (FIG. 1) or a method of increasing EGR rate. These two methods may be employed at the same time.

Alternatively, the catalyst activity maintenance mode may be implemented by engine operation modes in which the exhaust gas flow through the catalyst is smaller than that in the normal operation mode. Preferably the catalyst activity maintenance mode has a smaller exhaust gas flow than both the normal operation mode and the catalyst warm up acceleration mode. This prevents the catalyst from being cooled down by large amount of exhaust gas, thereby maintaining catalyst activity. Reduction of exhaust gas flow is attained by a method of decreasing the throttle valve 28 opening or a method of increasing EGR rate.

The catalyst activity maintenance mode is intended for maintaining the catalyst 40 at and above the activation temperature, and therefore it may provide smaller energy the catalyst 40 than the catalyst warm up acceleration mode. Preferably the catalyst activity maintenance mode may have a higher and poorer fuel consumption rate or a lower fuel efficiency than that of the normal operation mode but a lower and better fuel consumption rate or a higher fuel efficiency than that of the catalyst warm up acceleration mode.

Figure 6:
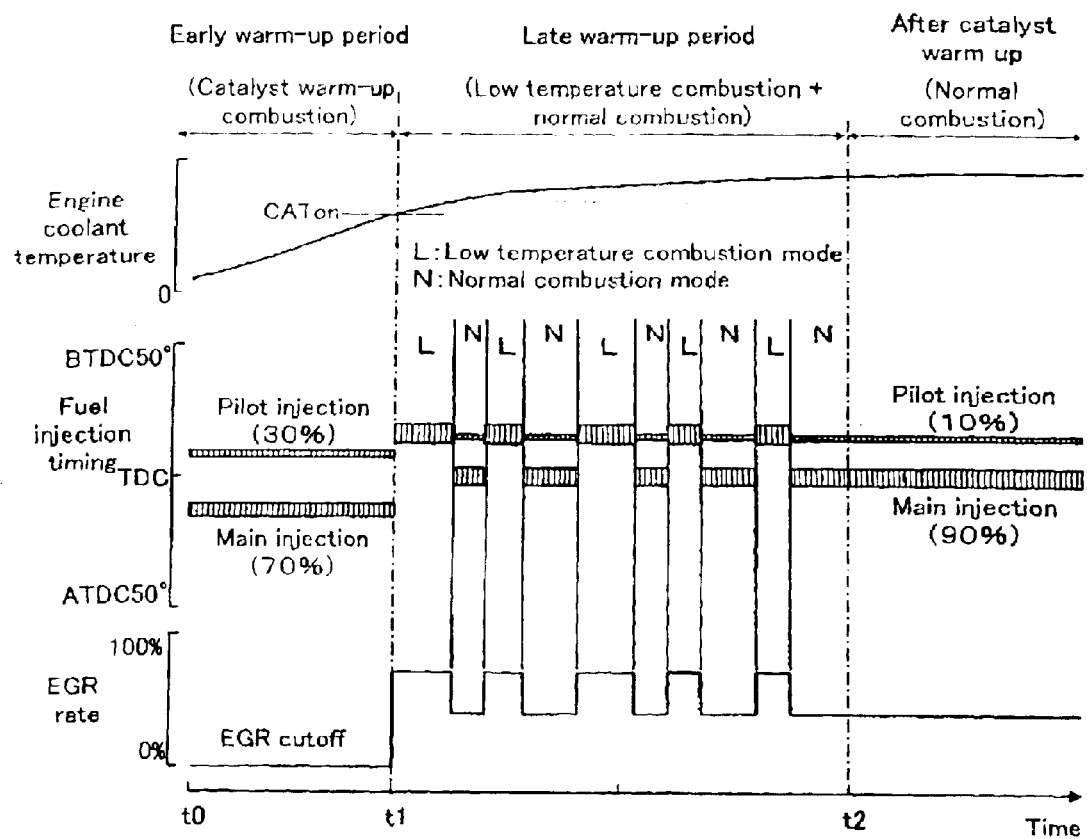
FIG. 6 illustrates operation of diesel engine 10 in a first embodiment of warm up control.

C. Warm up Control Embodiment 1:

FIG. 6 illustrate operation of diesel engine 10 in a first embodiment of warm up control. The horizontal axis in FIG. 6 plots time elapsed from startup (cold start), and the vertical axis plots, in order from the top, engine coolant temperature, fuel injection timing, and EGR rate. Once the engine is started up at time t0, a catalyst warm up acceleration operation (catalyst warm up combustion) to warm the catalyst 40 is performed in the early warm-up period until engine coolant temperature reaches predetermined temperature CATon at time t1. The early warm-up period may be defined to be a period which terminates when the engine coolant temperature reaches the predetermined temperature CATon, or a period which terminates when the catalyst bed temperature reaches a predetermined temperature. In the late warm-up period t1–t2, the catalyst activity maintenance operation and the normal operation are carried out. In this embodiment, the catalyst activity maintenance operation is implemented by the low temperature combustion described with reference to FIGS. 2 and 3, and the normal operation is implemented by the normal combustion. Subsequent to time t2, the normal operation is performed. In the example shown in FIG. 6, switching between the low temperature combustion and the normal combustion during the late warm-up period t1–t2 is simplified for convenience of illustration.

During the early warm-up period t0–t1, fuel injection is subdivided into pilot injection and main injection. The injection charge for pilot injection is set to equal about 30% of the total injection charge for one combustion cycle, and the injection charge for main injection to about 70%. Injection timing for pilot injection is approximately 10° ahead of top dead center TDC (i.e. TDC+approximately 10°), and injection timing for main injection is approximately 10° past top dead center TDC (i.e. TDC+approximately 10°). "Injection timing" herein refers to injection start time. The significance of injection charge and injection timing in the warm-up period will be described later.

During the early warm-up period the EGR rate is set to 0. That is, EGR valve 62 is shut, cutting off recirculation of combustion exhaust gases. The reason for doing so is that performing EGR at this time would result in exhaust temperature being brought down by the EGR cooler 64 (FIG. 1), which might inhibit warm up. It will be apparent that the EGR cutoff operation during the early warm-up period is employed as a means of raising exhaust gas temperature Tg in Equation (1) given above. However, it should be noted that EGR may take place to a certain extent during the early warm-up period. For example, the EGR rate may be set at about 10%–20%. This relatively low EGR rate will prevent excessive increase in NOx concentration due to EGR cutoff while accelerating warm up of the catalyst 40.

During the late warm-up period t1–t2, the low temperature combustion is performed under relatively low load conditions while the normal combustion is performed under relatively high load conditions. As described with reference to FIG. 3, the low temperature combustion provides higher catalyst inlet gas temperatures than the normal combustion, and it is suitable for maintaining catalyst activity accordingly. Since the catalyst temperature has been reached at or above the activation temperature during the early warm-up period, the low temperature combustion or the catalyst activity maintenance operation is not required to be performed continuously during the late warm-up period but it may be performed intermittently. On the contrary, the catalyst warm up acceleration operation is preferably performed continuously during the early warm-up period t0–t1 regardless of the engine load.

The normal combustion during the late warm-up period also employs both pilot injection and main injection as the catalyst warm up acceleration combustion in the early warm-up period. In the normal combustion, however, the pilot injection charge is set to approximately 10% of the total injection charge for one combustion cycle, and the injection charge for main injection to about 90%. Injection timing for pilot injection is (TDC–approximately 15°), and injection timing for main injection is (TDC+approximately 5°). This normal combustion is also employed in the normal operation mode after time t2.

Figure 7A:
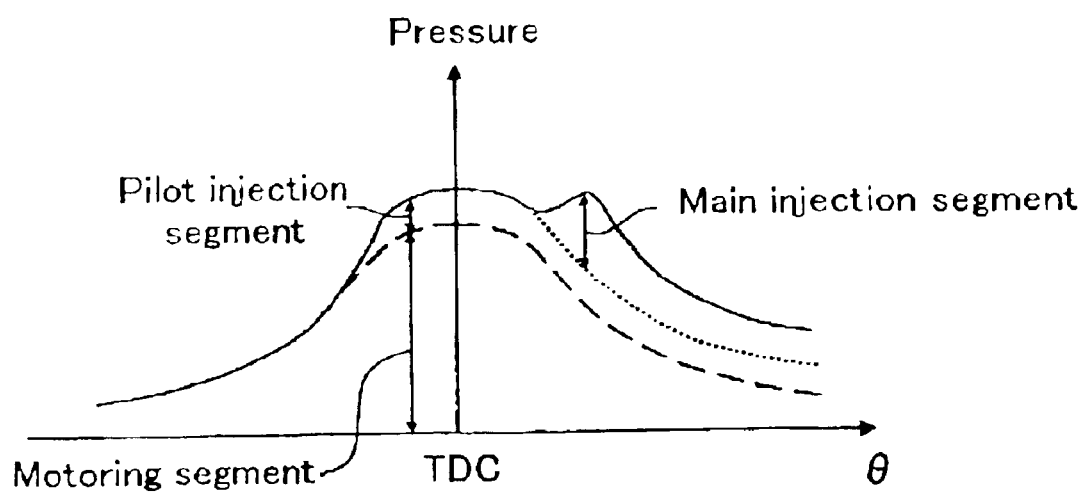
FIGS. 7A and 7B illustrate relationship of pressure change within the combustion chamber and heat release during the warm-up period.
Figure 7B:
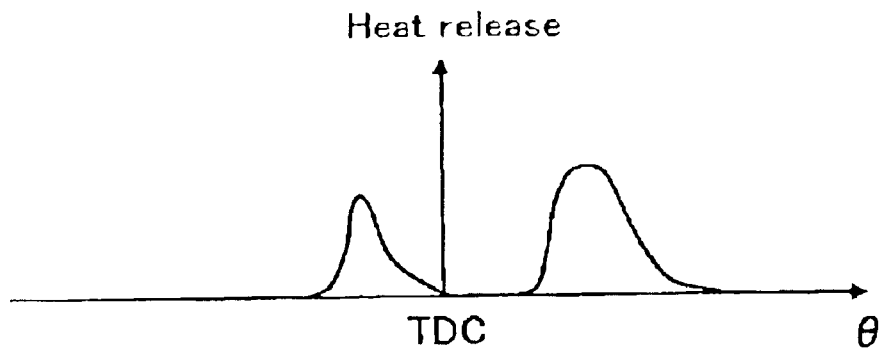

FIG. 7A shows pressure change within the combustion chamber during the early warm-up period, and FIG. 7B shows change in heat release. In FIGS. 7A and 7B, the horizontal axis plots crank angle θ. During the early warm-up period, both pilot injection and main injection are performed at points in time away from top dead center TDC, so the rate of pressure rise in proximity to top dead center TDC is minimal. Thus, the so-called degree of constant volume declines. It is known that in a diesel engine, heat efficiency typically drops with a drop in the isochoric pressure ratio, and exhaust energy increases. Specifically, fuel injected during pilot injection burns and releases heat ahead of top dead center TDC, but this heat performs substantially no outside work, but rather is used to increase temperature/pressure within the combustion chamber. Main injection is likewise performed at a point in time appreciably away from top dead center TDC, so a significant portion of the heat released is used to increase exhaust temperature.

Injection timing and injection charge for pilot injection and main injection during the early warm-up period are determined in consideration of the following issues. To increase exhaust energy, it is desirable for main injection to occur at a point in time that is considerably retarded past top dead center TDC (i.e. retarded by a considerable number of degrees). However, if main injection is retarded by too many degrees, there is the possibility of misfire. Since increasing the injection charge for pilot injection has the effect of raising temperature in the combustion chamber, the likelihood of misfire when main injection is retarded by several degrees is reduced. Additionally, there is a somewhat preferred value (expressed in terms of crank angle, 20° for example) for the interval between pilot injection and main injection timing. Accordingly, the timing for pilot injection and main injection is determined such that the likelihood of misfire is low, and such that the timing for main injection is retarded as long as possible. Injection timing and injection charge for pilot injection and main injection are determined so as to include the increase in exhaust energy as well as meet the required load. As a result, in the early warm-up period, the pilot injection charge is relatively larger, and main injection timing later, than in normal combustion.

Under operating conditions of equal load, total injection charge is greater during the catalyst warm up acceleration combustion in the early warm-up period than in the normal combustion. The injection charge proportion for pilot injection (pilot injection charge/total injection charge) during the early warm-up period is preferably about two to about five times the injection charge proportion for pilot injection during the normal combustion.

As will be understood from the preceding description, fuel injection during the early warm-up period in the first embodiment herein is characterized by the following.

(1) The injection charge proportion for pilot injection during the early warm-up period to is greater than the injection charge proportion for pilot injection during normal combustion after the early warm-up period.

(2) Injection timing for main injection during the early warm-up period is retarded relative to injection timing for main injection during normal combustion after the early warm-up period.

Through control in this manner, it is possible to retard main injection by a considerable number of degrees and increase exhaust energy, so that catalyst 40 may be warmed up more efficiently. The larger injection charge for pilot injection means that temperature and pressure in the combustion chamber are appreciably elevated during main injection. Thus, the fuel injected during main injection is adequately combusted, so that HC concentration in combustion exhaust gases can be reduced. That is, according to Embodiment 1 the catalyst can be warmed efficiently while holding down HC concentration.

While there is a certain amount of flexibility as regards the timing for pilot injection and main injection, in terms of warming the catalyst, pilot injection will preferably occur just ahead of top dead center, and main injection past top dead center. By so doing, the catalyst can be warmed more efficiently while holding down HC concentration.

Figure 8:
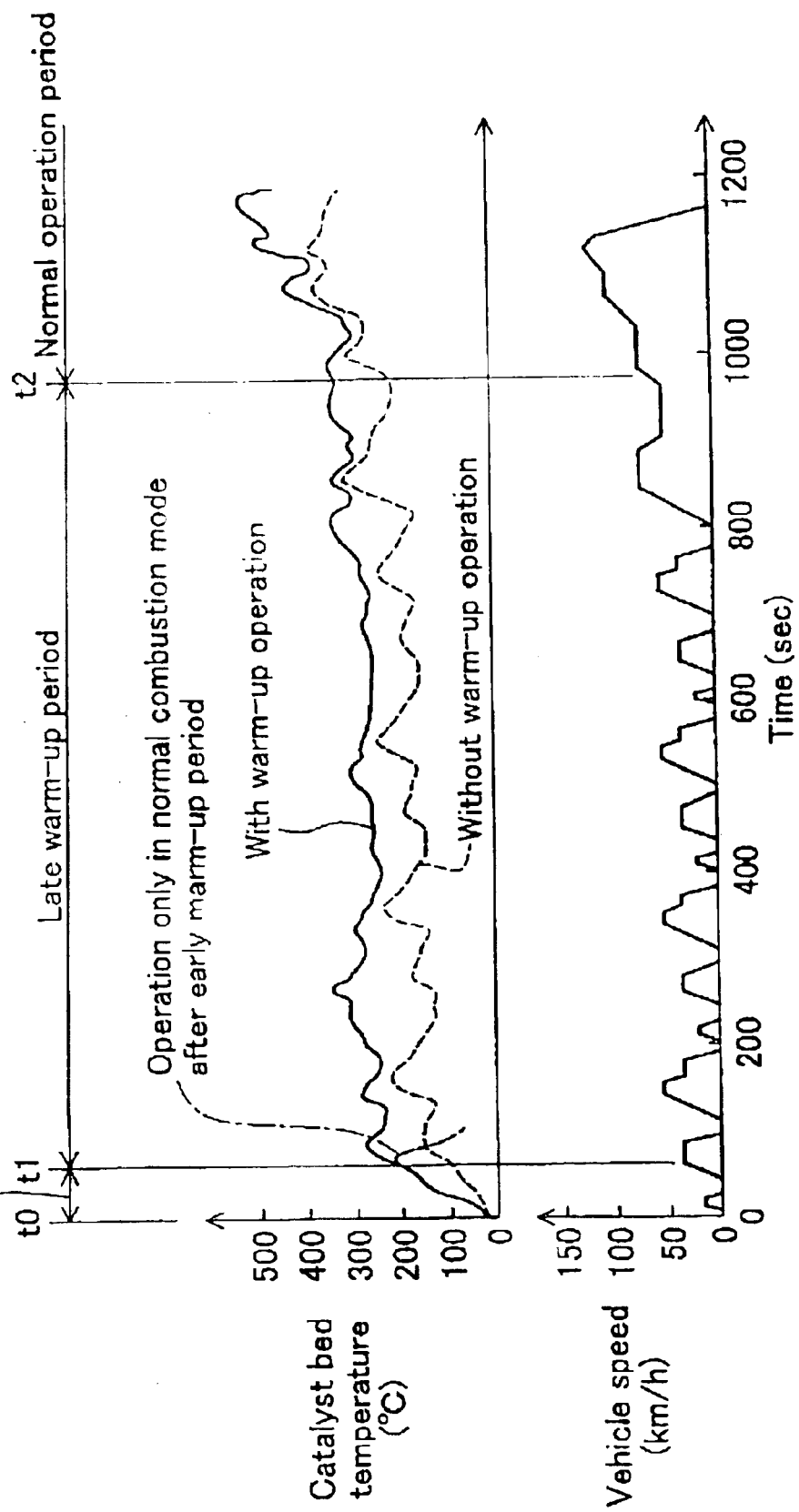
FIG. 8 illustrate an experimental result of the catalyst warm up operation.

FIG. 8 illustrate an experimental result of the catalyst warm up operations (catalyst warm up acceleration and catalyst activity maintenance) according to the first embodiment. The change of vehicle speed is the same as that in FIG. 5. When the warm up operations are performed, the catalyst bed temperature reaches the activation temperature at the end time t1 of the early warm-up period, that is, about 70 seconds after the startup, and it is maintained above the activation temperature thereafter. Without the warm up operations, on the other hand, the catalyst bed temperature reaches the activation temperature about 1000 seconds after startup. As will be understood from this results, the warm up operations according to the first embodiment will activate the catalyst 40 in a relatively short time period and maintain its activation thereafter.

The late warm-up period may be omitted and the normal combustion or normal operation mode may be employed after the catalyst reaches the activation temperature. However, as described with reference to FIG. 3, the normal combustion provides lower catalyst inlet gas temperature than the low temperature combustion, and also provides a lower EGR rate which increases exhaust gas flowing through the catalyst 40. Accordingly, if only the normal combustion is performed after the early warm-up period, the catalyst 40 may be cooled down with large amount of exhaust gas below the activation temperature as shown with the dot/dashed line in FIG. 8. In the first embodiment, on the other hand, the catalyst activity will be maintained during the late warm-up period because the low temperature combustion is performed in relatively low load conditions.

Figure 9:
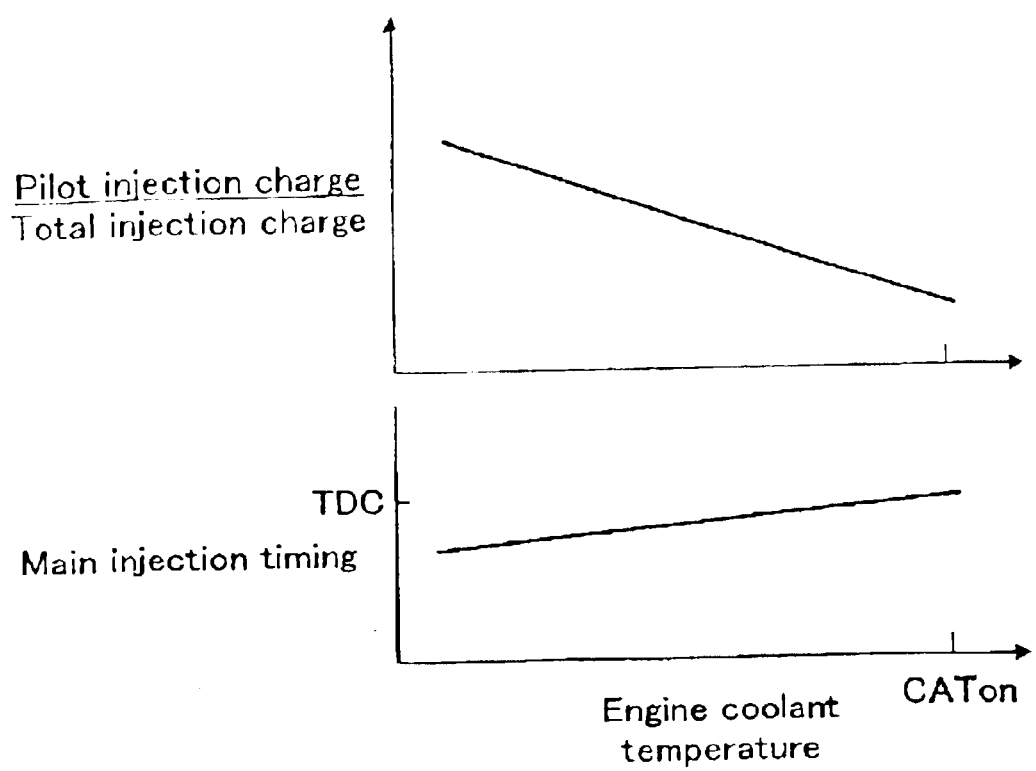
FIG. 9 shows modification of injection charge proportions and injection timing with reference to engine coolant temperature.

In the example of FIG. 6, pilot injection and main injection charge proportions and injection timing are held constant during the early warm-up period, but these could be modified depending on the warm up process. FIG. 9 show modification of charge proportions and injection timing with reference to engine coolant temperature. In this example, rise in engine coolant temperature is accompanied by a decrease in the injection charge proportion for pilot injection, while main injection timing is accelerated by several degrees. In other words, as engine coolant temperature rises, adjustments are made so that conditions more closely approximate those for injection during the normal combustion. By so doing, the catalyst can be warmed through injection conducted appropriately for the warm up process. Charge proportions and injection timing for pilot injection and main injection could be modified with reference to catalyst bed temperature, rather than engine coolant temperature.

Figure 10:
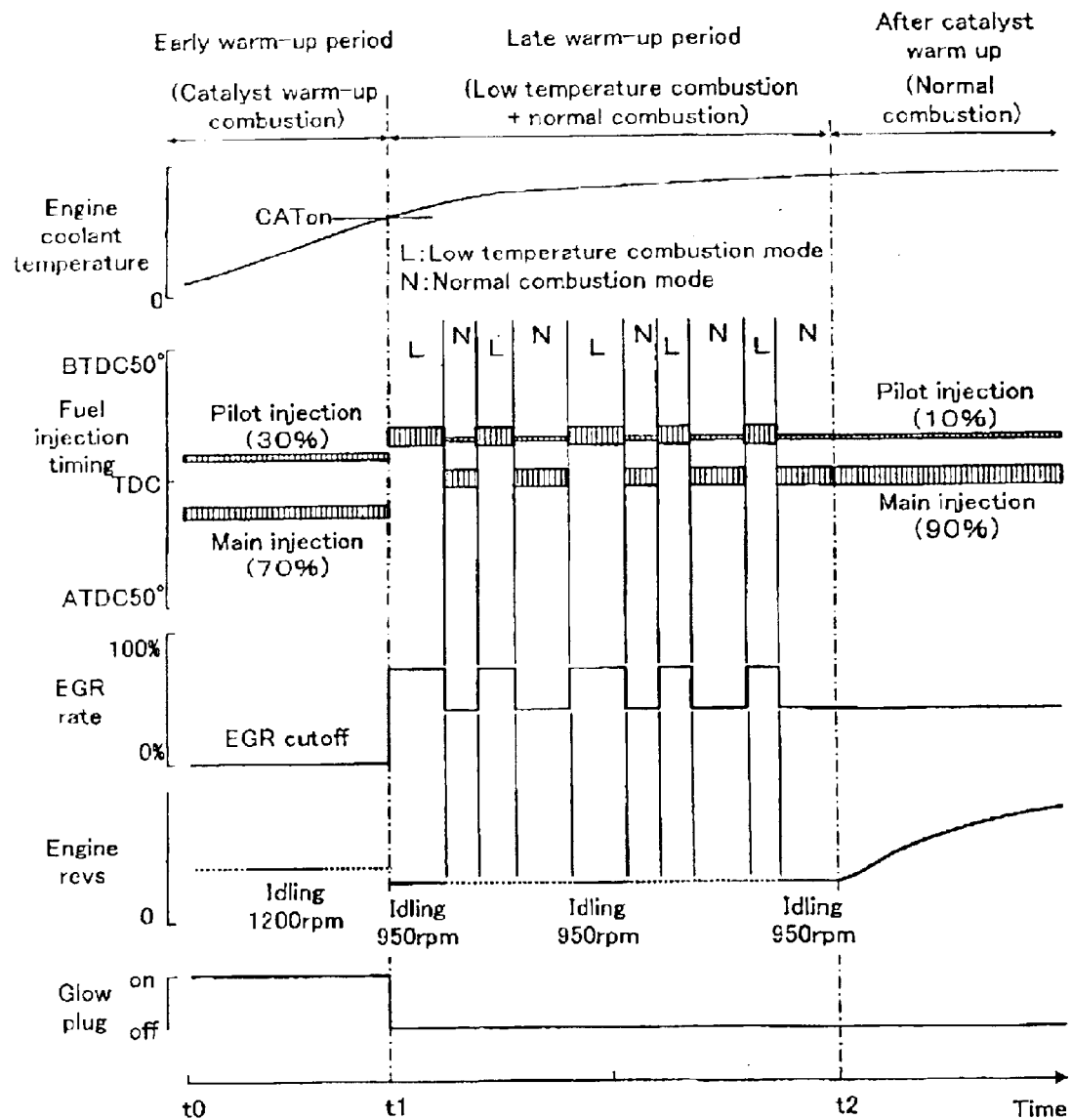
FIG. 10 illustrates operation of diesel engine 10 in a second embodiment of warm up control.

D. Warm up Control Embodiment 2:

FIG. 10 is an illustration showing operation of diesel engine 10 in a second embodiment of warm up control. As will be described hereinbelow, in Embodiment 2 charge proportions and injection timing for pilot injection and main injection during the early warm-up period are more optimized than in Embodiment 1.

Figure 11:
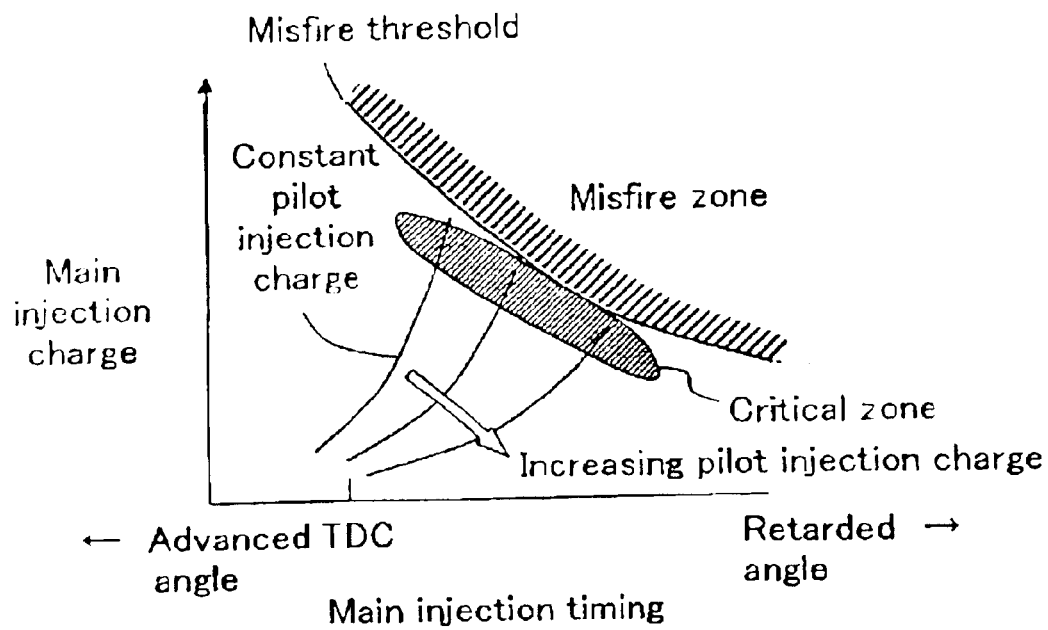
FIG. 11 illustrates relationships of main injection timing and main injection charge to the misfire zone.

FIG. 11 illustrates relationships of main injection timing and main injection charge to the misfire zone. As will be understood from the figure, retarding the main injection timing by several degrees for a given main injection charge results in crossing the misfire threshold and entering the misfire zone. It should be noted that the misfire threshold crank angle shifts towards the retarded angle end with smaller main injection charge. Solid lines in FIG. 11 show main injection timing and injection charge for producing a given level of torque, assuming constant pilot injection charge. Typically, delaying the timing for main injection by several degrees causes heat efficiency to drop. Accordingly, under conditions in which the pilot injection charge is maintained at a given value, retarding the main injection timing by more degrees means that a greater main injection charge will be required to produce a given level of torque. Where pilot injection charge is increased, a given level of torque can be generated with a given main injection charge, even where main injection timing is retarded by more degrees.

Figure 12:
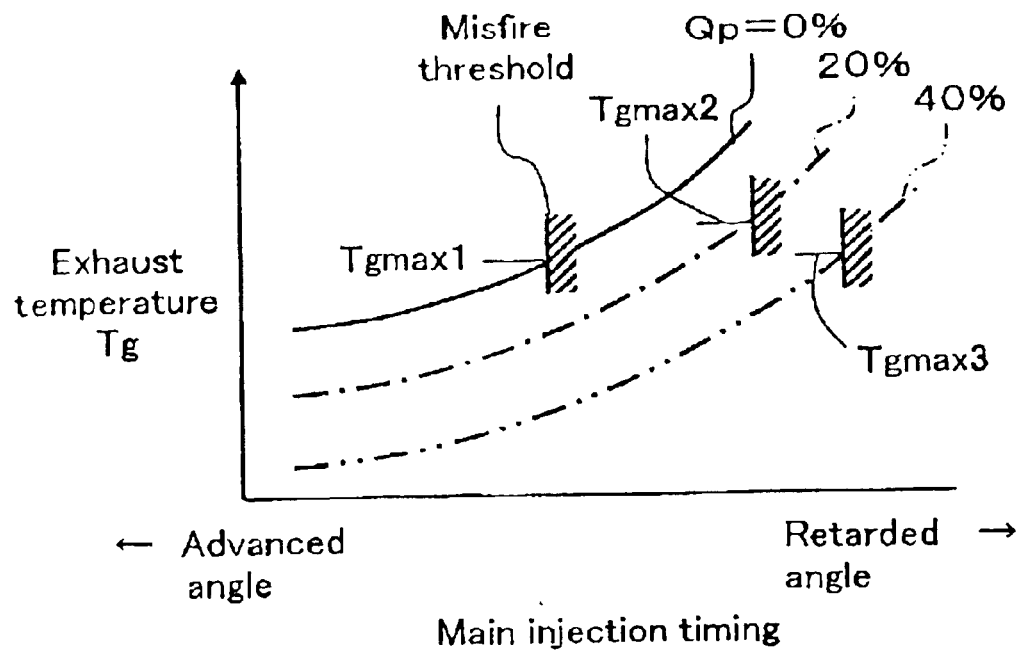
FIG. 12 illustrates change in exhaust gas temperature Tg occurring with certain fuel injection conditions.
Figure 13:
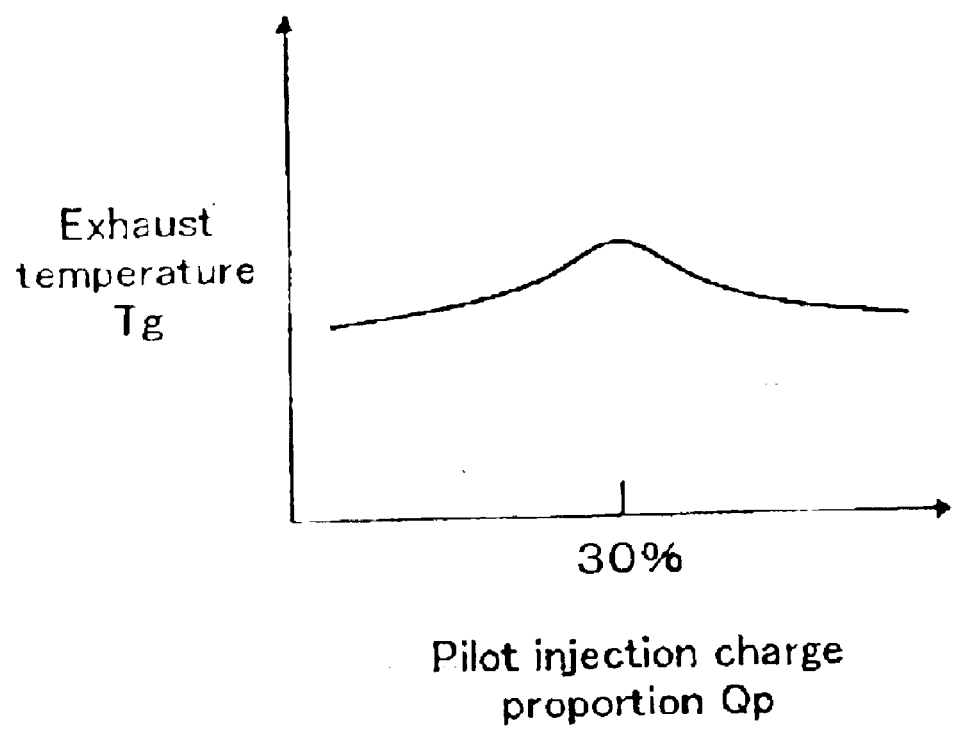
FIG. 13 plots the relationship of pilot injection charge proportion and exhaust gas temperature Tg.

In the critical zone in proximity to the misfire threshold, main injection timing is retarded by a sufficient number of degrees so that exhaust gas temperature is high. Exhaust gas temperature in the critical zone is dependent upon fuel injection conditions. FIG. 12 illustrates the change in exhaust gas temperature Tg occurring with certain fuel injection conditions. The horizontal axis in FIG. 12 indicates main injection timing and the vertical axis indicates exhaust gas temperature. The solid line graphs the function where the pilot injection charge proportion Qp (pilot charge as a percentage of total injection charge) is assumed to be 0%; the dot/dashed line plots this function at 20%; and the double dot/dashed line the function at 40%. As will be apparent from the figure, when pilot injection charge proportion Qp is increased from 0% to 20%, main injection timing coincident with the misfire threshold is retarded by more degrees, and accordingly exhaust gas temperature Tg in the misfire threshold critical zone is higher. Incidentally, increasing pilot injection charge proportion Qp to an excessive degree (40%, for example) means a corresponding decrease in the main injection charge proportion, so conversely the exhaust gas temperature Tg will fall. FIG. 13 plots the change of exhaust gas temperature Tg shown in FIG. 12 in terms of a function of pilot injection charge proportion. As will be apparent from the figure, where conditions for main injection have been set within the critical zone in FIG. 11, there exists a certain optimal condition for pilot injection charge proportion, at which the highest exhaust gas temperature Tg is achieved. This optimal injection condition is determined experimentally for each individual engine. Since this optimal condition is dependent on engine temperature as well, in preferred practice it will be modified depending on engine coolant temperature, for example.

Where the sum of the main injection charge and the pilot injection charge is constant, injection conditions can be optimized in consideration of the following two instances. Where the pilot injection charge is fairly large, the main injection charge is smaller, but the timing for main injection can be retarded. On the other hand, where the pilot injection charge is smaller, the main injection charge is larger, and it will be necessary to advance the main injection timing. The optimal condition for pilot injection and main injection that will afford the highest exhaust gas temperature Tg is determined by balancing these two instances. In other words, this optimal condition lies somewhere between a condition in which the pilot injection charge is the maximum possible without causing misfire, and the minimum possible. The optimal condition can be discovered by looking between these two extreme conditions.

As described hereinabove, during the early warm-up period in Embodiment 2 the pilot injection charge proportion and main injection timing are set so as to coincide with the timing of the critical zone just ahead of the misfire threshold, so as to give the maximum exhaust gas temperature Tg. This has the effect of increasing exhaust energy, making it possible to efficiently accelerate warm up of the catalyst. This critical zone, expressed in terms of crank angle, preferably ranges from the misfire threshold to about 2 degrees of crank angle ahead of the misfire threshold, and more preferably from the misfire threshold to about 1 degree ahead of the misfire threshold.

In Embodiment 2, three additional means, namely an EGR cutoff operation, increasing idling speed, and continuous use of a glow plug, are employed in addition to adjusting injection conditions, in order to accelerate the rise in temperature of the exhaust gases.

As shown in FIG. 10, in Embodiment 2, EGR is cut off during the early warm-up period as is the case with Embodiment 1. As a result, drop in exhaust temperature due to heat loss in the EGR cooler 64 (FIG. 1) is prevented, so that catalyst warm up can be accelerated. In the example shown in FIG. 10, idling speed is set to 1200 rpm during the early warm-up period, and after the early warm-up period is set to 950 rpm. By increasing idling speed during the early warm-up period in this way, it is possible to increase the exhaust gas velocity V in Equation (1), and thereby accelerate warming up of the catalyst 40.

Figure 14:
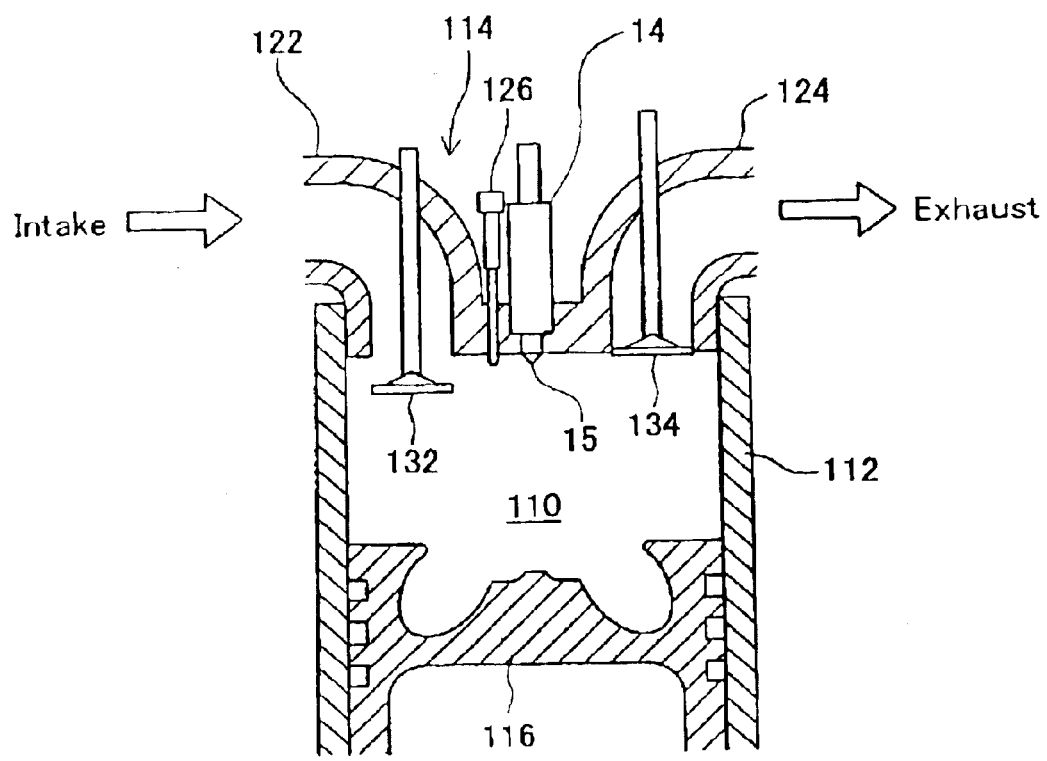
FIG. 14 is a longitudinal cross section of a combustion chamber.

As shown at bottom in FIG. 10, the glow plug is employed continuously during the early warm-up period. FIG. 14 is a longitudinal cross section of the combustion chamber. Combustion chamber 110 comprises a cylinder wall 112, a cylinder head 114, and a piston 116. Cylinder 114 comprises an intake port 122 and an exhaust port 124. Intake port 122 is provided with an intake valve 132. Exhaust port 124 is provided with an exhaust port 134. A fuel injection valve 14 is disposed at a substantially central location of the cylinder head 114, and a glow plug 126 is disposed near the nozzle 15 of the fuel injection valve 14. Glow plug 126 may be situated in any location enabling it to heat the intake air, for example, in the intake port 122. Another type of heater such as an air intake heater may be employed in place of the glow plug 126.

Typically, a glow plug 126 is used only for a brief period at startup to improve startup of engine 10. In Embodiment 2, however, glow plug 126 is kept continuously in the ON state for a considerable period of time during the early warm-up period. By so doing, exhaust gas temperature is raised further, so that warm up of catalyst 40 can be accelerated.

The aforementioned three operations, namely, the EGR cutoff operation, continuous use of the glow plug, and increasing idling speed, need not be carried out simultaneously, but in preferred practice at least one of these operations will be carried out at least in part during the early warm-up period. The extent of these operations will preferably be varied depending on engine coolant temperature and catalyst bed temperature, and operations may be halted during the early warm-up period if they should become unnecessary.

Figure 15:
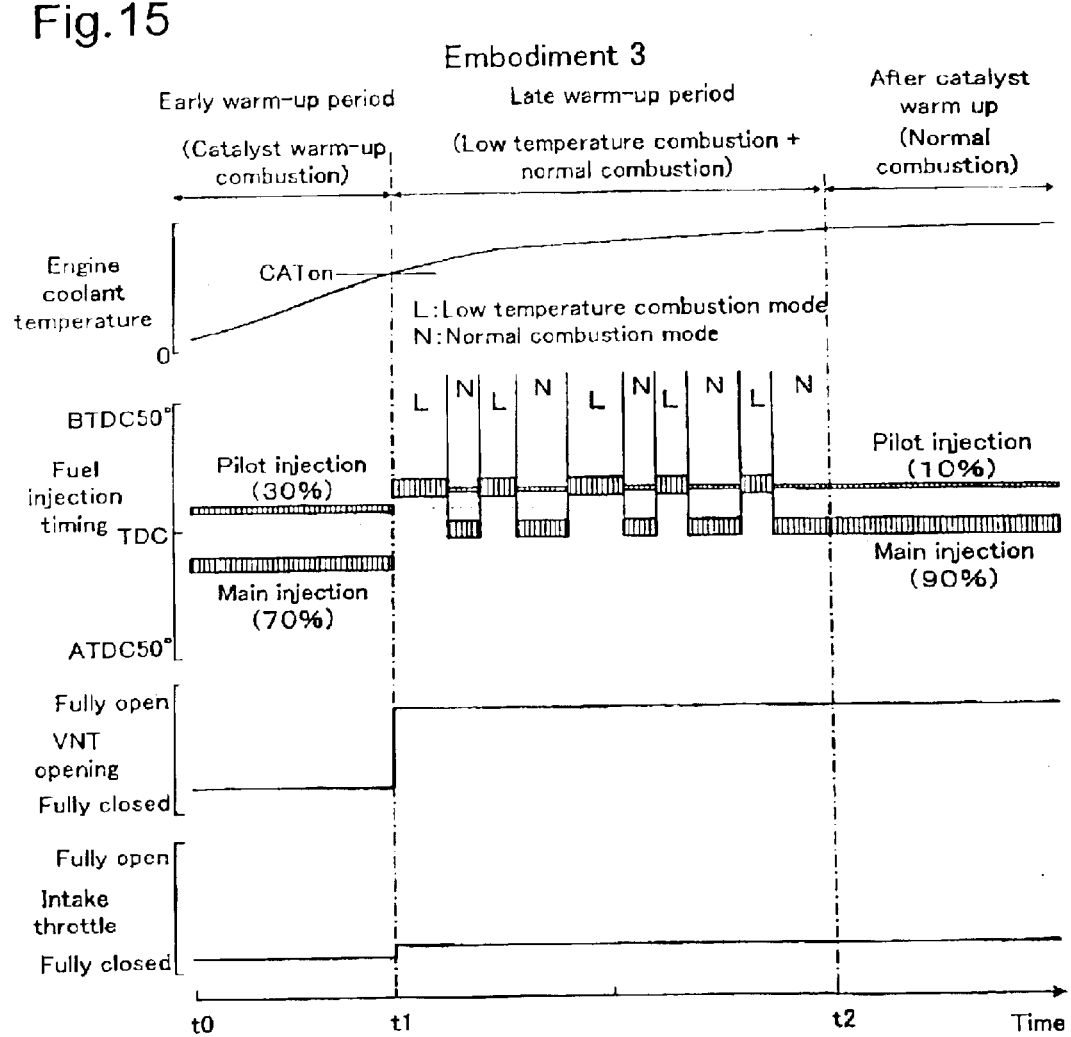
FIG. 15 illustrates operation of diesel engine 10 in a third embodiment of warm up control.

E. Warm up Control Embodiment 3:

FIG. 15 is an illustration showing operation of diesel engine 10 in a third embodiment of warm up control. In this third embodiment, fuel injection timing and injection charge are the same as in Embodiment 1 shown in FIG. 6, but the embodiment features restricting the opening of the inlet nozzle 25 of variable nozzle turbocharger (VNT) 20 and the intake throttle (throttle valve 28) during the early warm-up period. After the early warm-up period, the VNT and intake throttle continue to be adjusted depending on required load, but this is omitted from FIG. 15 for simplicity.

Figure 16:
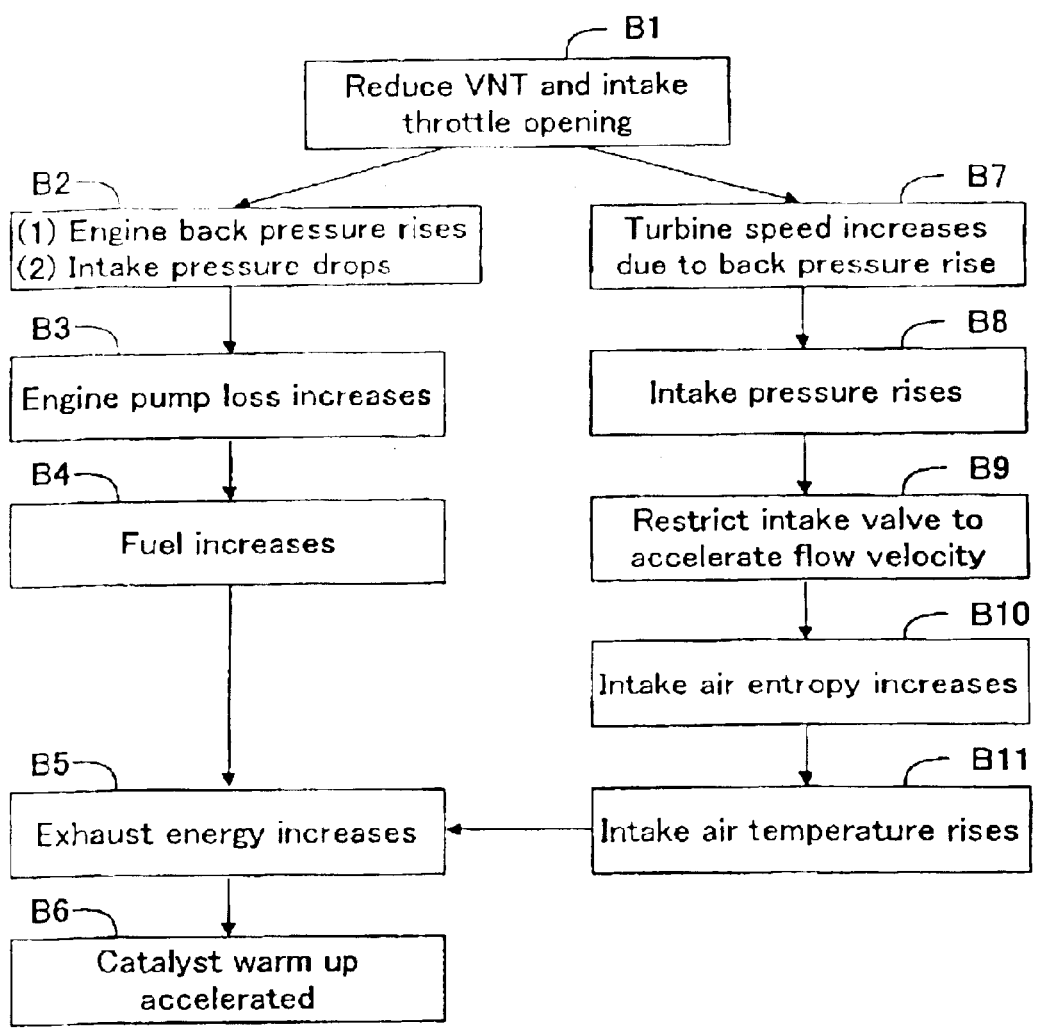
FIG. 16 illustrates effect on catalyst warm up of adjusting the VNT and intake throttle.

FIG. 16 shows the effect on catalyst warm up of adjusting the VNT and intake throttle. Restricting the nozzle opening of the VNT increases engine back pressure (Block B2). Restricting the opening of the intake throttle causes intake pressure to drop. The rise in engine back pressure and the drop in intake pressure result in an increase in pump loss of the engine (Block B3), increasing the amount of fuel needed to generate the required power (Block B4). As a result, exhaust energy increases (Block B5), so that warming of the catalyst can be accelerated (Block B6). Restricting the opening of the intake throttle also reduces intake flow, which has the effect in increasing intake air temperature.

Meanwhile, the rise in engine back pressure also has the effect of increasing turbine speed (Block B7). The increase in turbine speed is accompanied by a rise in intake pressure (Block B8). Since the intake valve is restricted, flow velocity through the intake line increases (Block B9). This means that and entropy in the intake air increases, and intake air temperature rises (Blocks B10, B11). As a result, exhaust energy increases (Block B5) so that warming of the catalyst can be accelerated (Block B6).

In this way, warming of the catalyst can be accelerated by restricting the VNT and intake throttle during the early warm-up period to a greater extent than after the early warm-up period. Control in this manner reduces the likelihood of increased HC concentration. Thus, warming of the catalyst can be accelerated while holding down HC concentration.

Figure 17:
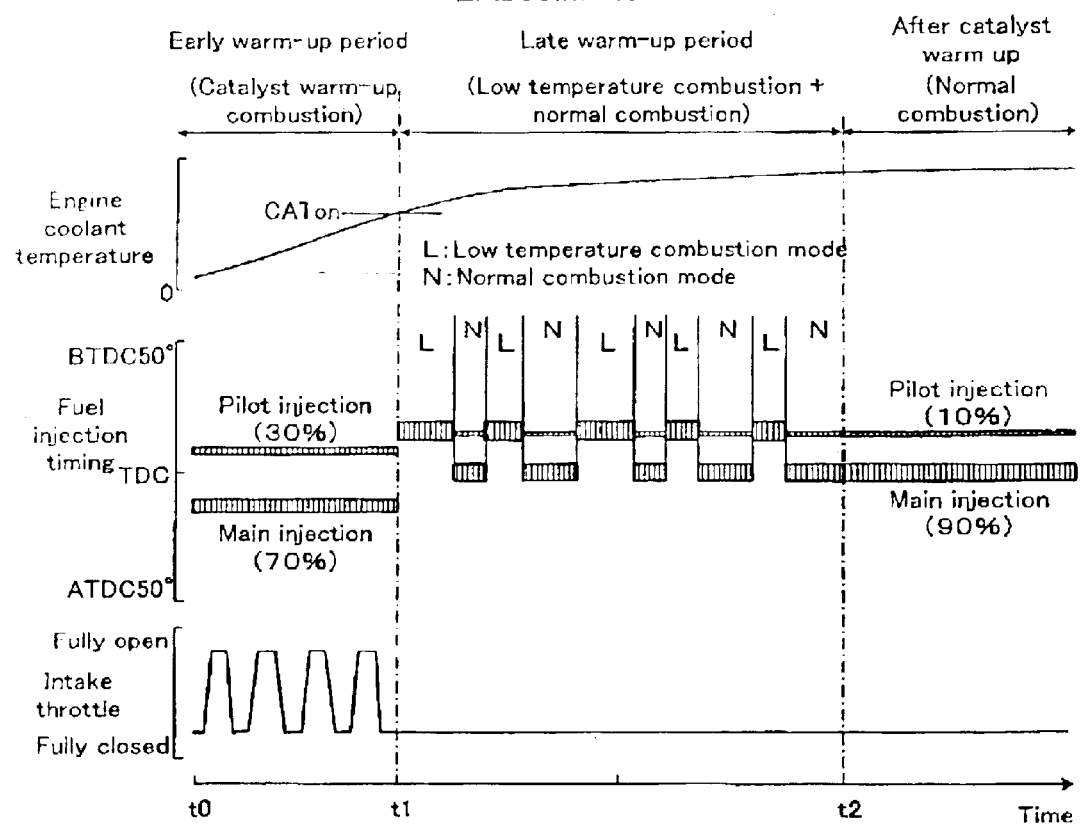
FIG. 17 illustrates operation of diesel engine 10 in a fourth embodiment of warm up control.

F. Warm up Control Embodiment 4:

FIG. 17 is an illustration showing operation of diesel engine 10 in a fourth embodiment of warm up control. In this fourth embodiment, fuel injection timing and injection charge are the same as in Embodiment 1 shown in FIG. 6, but the embodiment features opening and closing the intake throttle (throttle valve 28) at a higher rate of speed during the early warm-up period. Opening and closing the intake throttle at high speed imparts the energy of this operation to the intake air, increasing the entropy of the intake air and causing intake air temperature to rise. Accordingly, exhaust temperature rises as well, so that warm up of the catalyst can be accelerated. Control in this manner reduces the likelihood of increased HC concentration, so warming of the catalyst can be accelerated while holding down HC concentration.

As will be understood from the preceding description of Embodiments 3 and 4, by adjusting the opening of the intake throttle and VNT during the early warm-up period, exhaust temperature can be increased, and warm up of the catalyst can be accelerated without increasing HC concentration. Since the controls employed in Embodiments 3 and 4 have no direct relationship to fuel injection timing and injection charge, they may be implemented in any arbitrary combination with the controls employed in Embodiments 1 and 2.

G1. Variation 1:

The invention is not limited to application in automobiles, and may be implemented in engines of various moving bodies other than automobiles, such as railway cars, aircraft, ships and so on.

G2. Variation 2:

In the embodiments hereinabove, operating mode switchover is performed with reference to engine coolant temperature or catalyst bed temperature, but the switchover could instead be performed using other monitored values. Alternatively, a certain operation mode may be switched to another operation mode when the certain operation mode is performed for a predetermined time period.

G3. Variation 3:

In the embodiments hereinabove, temperature sensors are employed for direct measurement of catalyst bed temperature and engine coolant temperature, but these temperature could instead be measured indirectly. That is, temperature of some element other than the catalyst or engine coolant could be measured, and catalyst bed temperature or engine coolant temperature may be interpolated therefrom. In other words, it is possible to employ temperature sensors that sense temperatures substantially indicative of catalyst bed temperature or engine coolant temperature.

G4. Variation 4:

In the embodiments hereinabove, the various settings employed (for fuel injection charge and injection timing, for example) are merely exemplary, it being possible to employ various other values. The various operations employed in the embodiments hereinabove may be combined in various ways for the catalyst warm-up period.

G5. Variation 5:

The various operations (operating modes) for catalyst warm up described hereinabove need not continue throughout the entirety of each warm-up period, provided they take place over at least a portion thereof. The terms "in the warm-up period" and "during the warm-up period" herein may mean "in a least a portion of the warm-up period" unless otherwise stated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A diesel engine comprising:
   a combustion chamber;
   a fuel injection device for injecting fuel into the combustion chamber;
   a catalyst for purifying exhaust gases from the combustion chamber; and
   a controller for controlling a plurality of devices of the diesel engine including the fuel injection device;
   wherein the controller is configured to perform operation in a first warm-up mode in an early warm-up period after startup of the diesel engine, and to perform operation in a second warm-up mode in a late warm-up period after the early warm-up period, so as to accelerate and maintain activation of the catalyst;
   wherein the first warm-up mode is configured to provide more energy to the catalyst with exhaust gases than a normal operation mode of the diesel engine, the normal operation mode being performed after the late warm-up period;
   wherein the second warm-up mode is configured to provide exhaust gases of higher temperature to the catalyst than the normal operation mode; and
   wherein the second warm-up mode provides a smaller exhaust gas flow to the catalyst than both the first warm-up mode and the normal operation mode.

2. A diesel engine according to claim 1, wherein the second warm-up mode provides a smaller air ratio within the combustion chamber than both the first warm-up mode and the normal operation mode.

3. A diesel engine according to claim 1, wherein the second warm-up mode provides a better fuel consumption rate than the first warm-up mode and a poorer fuel consumption rate than the normal operation mode.

4. A diesel engine according to claim 1, wherein the early warm-up period terminates when an engine coolant temperature reaches a predetermined first value or when a temperature of the catalyst reaches a predetermined second value.

5. A diesel engine according to claim 1, wherein the second warm-up mode is performed when predetermined conditions are satisfied, the predetermined conditions including a condition that a required load for the diesel engine is lower than a predetermined value.

6. A diesel engine according to claim 5, wherein the second warm-up mode is a low temperature combustion mode.

7. A diesel engine according to claim 1, wherein the controller is configured to perform in the first warm-up mode:
   (i) controlling the fuel injection device such that fuel injection is subdivided into pilot injection and main injection;
   (ii) setting an injection charge proportion for the pilot injection to a level higher than an injection charge proportion for the pilot injection in the normal operation mode, and
   (iii) retarding an injection timing for the main injection relative to an injection timing for the main injection in the normal operation mode.

8. A diesel engine according to claim 7, wherein the injection charge proportion for the pilot injection in the first warm-up mode is within a range of about twice to about five times the injection charge proportion for the pilot injection in the normal operation mode.

9. A diesel engine according to claim 7, wherein in the first warm-up mode the injection timing for the pilot injection is set to ahead of top dead center, and the injection timing for the main injection is set to past the top dead center.

10. A diesel engine according to claim 7, further comprising a temperature sensor for sensing a temperature substantially indicating a bed temperature of the catalyst,
    wherein the controller is configured to regulate the injection charge proportion for the pilot injection and the injection timing of the main injection in the first warm-up mode as a function of the bed temperature of the catalyst.

11. A diesel engine according to claim 7, further comprising a temperature sensor for sensing a temperature substantially indicating a coolant temperature of the combustion chamber,
    wherein the controller is configured to regulate the injection charge proportion for the pilot injection and the injection timing of the main injection in the first warm-up mode as a function of the coolant temperature.

12. A diesel engine according to claim 7, wherein the injection charge proportion for the pilot injection and the injection timing for the main injection in the first warm-up mode are set such that the main injection corresponds a point in time just ahead of a misfire threshold.

13. A diesel engine according to claim 12, wherein the point in time just ahead of the misfire threshold occurs at a crank angle within a range between the misfire threshold and about 2 degrees of crank angle before the misfire threshold.

14. A diesel engine according to claim 12, further comprising an EGR device for recirculating exhaust gases from the combustion chamber to an air intake passage leading to the combustion chamber, and
    a heater provided to an air intake port or the combustion chamber,
    wherein the controller performs at least one of the following in the first warm-up mode:
    (a) an EGR cutoff operation for halting recirculation of exhaust gases by the EGR device;
    (b) a continuous intake heating operation by the heater; and
    (c) an idling speed increasing operation for increasing idling speed of the diesel engine to a level higher than an idling speed in the normal operation mode.

15. A diesel engine according to claim 7, further comprising:
    a turbocharger for compressing air charge to be supplied to the combustion chamber with energy of the exhaust gases from the combustion chamber,
    wherein the turbocharger is a variable turbocharger configured to regulate supercharge pressure of the air charge by means of regulating working pressure of exhaust gases supplied to the turbocharger; and the controller increases, in the first warm-up mode, the working pressure of exhaust gases supplied to the variable turbocharger to a level above working pressure in the normal operation mode.

16. A diesel engine according to claim 15, further comprising an intake throttle valve for restricting the air intake passage leading to the combustion chamber, wherein in the first warm-up mode the controller increases restriction by the intake throttle valve to a level above restriction in the normal operation mode.

17. A diesel engine according to claim 15, further comprising an air intake throttle valve for restricting the air intake passage leading to the combustion chamber, wherein in the first warm-up mode the controller repeatedly performs opening and closing of the intake throttle valve.

18. An operation method of a diesel engine including a combustion chamber, a fuel injection device for injecting fuel into the combustion chamber, and a catalyst for purifying exhaust gases from the combustion chamber, the method comprising the steps of:

performing engine operation in a first warm-up mode in an early warm-up period after startup of the diesel engine, so as to accelerate activation of the catalyst;

performing engine operation in a second warm-up mode in a late warm-up period after the early warm-up period, so as to maintain activity of the catalyst, wherein the first warm-up mode is configured to provide more energy to the catalyst with exhaust gases than a normal operation mode of the diesel engine, the normal operation mode being performed after the late warm-up period;

wherein the second warm-up mode is configured to provide exhaust gases of higher temperature to the catalyst than the normal operation mode; and wherein the second warm-up mode provides a smaller exhaust gas flow to the catalyst than both the first warm-up mode and the normal operation mode.

19. A method according to claim 18, wherein the second warm-up mode provides a smaller air ratio within the combustion chamber than both the first warm-up mode and the normal operation mode.

20. A method according to claim 18, wherein the second warm-up mode provides a better fuel consumption rate than the first warm-up mode and a poorer fuel consumption rate than the normal operation mode.

21. A method according to claim 18, wherein the early warm-up period terminates when an engine coolant temperature reaches a predetermined first value or when a temperature of the catalyst reaches a predetermined second value.

22. A method according to claim 18, wherein the second warm-up mode is performed when predetermined conditions are satisfied, the predetermined conditions including a condition that a required load for the diesel engine is lower than a predetermined value.

23. A method according to claim 22, wherein the second warm-up mode is a low temperature combustion mode.

24. A method according to claim 18, wherein the engine operation in the first warm-up mode includes:

(i) controlling the fuel injection device such that fuel injection is subdivided into pilot injection and main injection;

(ii) setting an injection charge proportion for the pilot injection to a level higher than an injection charge proportion for the pilot injection in the normal operation mode, and (iii) retarding an injection timing for the main injection relative to an injection timing for the main injection in the normal operation mode.

25. A method according to claim 24, wherein the injection charge proportion for the pilot injection in the first warm-up mode is within a range of about twice to about five times the injection charge proportion for the pilot injection in the normal operation mode.

26. A method according to claim 24, wherein in the first warm-up mode the injection timing for the pilot injection is set to ahead of top dead center, and the injection timing for the main injection is set to past the top dead center.

27. A method according to claim 24, further comprising the step of sensing a temperature substantially indicating a bed temperature of the catalyst, wherein the engine operation in the first warm-up mode includes regulating the injection charge proportion for the pilot injection and the injection timing of the main injection as a function of the bed temperature of the catalyst.

28. A method according to claim 24, further comprising the step of sensing a temperature substantially indicating a coolant temperature of the combustion chamber, wherein the engine operation in the first warm-up mode includes regulating the injection charge proportion for the pilot injection and the injection timing of the main injection as a function of the coolant temperature.

29. A method according to claim 24, wherein the injection charge proportion for the pilot injection and the injection timing for the main injection in the first warm-up mode are set such that the main injection corresponds a point in time just ahead of a misfire threshold.

30. A method according to claim 29, wherein the point in time just ahead of the misfire threshold occurs at a crank angle within a range between the misfire threshold and about 2 degrees of crank angle before the misfire threshold.

31. A method according to claim 29, wherein the diesel engine further includes an EGR device for recirculating exhaust gases from the combustion chamber to an air intake passage leading to the combustion chamber, and a heater provided to an air intake port or the combustion chamber, wherein the engine operation in the first warm-up mode includes at least one of the following:

(a) an EGR cutoff operation for halting recirculation of exhaust gases by the EGR device;

(b) a continuous intake heating operation by the heater; and (c) an idling speed increasing operation for increasing idling speed of the diesel engine to a level higher than an idling speed in the normal operation mode.

32. A method according to claim 24, wherein the diesel engine further includes a turbocharger for compressing air charge to be supplied to the combustion chamber with energy of the exhaust gases from the combustion chamber, the turbocharger being a variable turbocharger configured to regulate supercharge pressure of the air charge by means of regulating working pressure of exhaust gases supplied to the turbocharger, and the engine operation in the first warn-up mode includes the step of increasing the working pressure of exhaust gases supplied to the variable turbocharger to a level above working pressure in the normal operation mode.

33. A method according to claim 32, wherein the diesel engine further includes an intake throttle valve for restricting the air intake passage leading to the combustion chamber, wherein the engine operation in the first warm-up mode further comprises the step of increasing restriction by the intake throttle valve to a level above restriction in the normal operation mode.

34. A method according to claim 32, wherein the diesel engine further includes an air intake throttle valve for restricting the air intake passage leading to the combustion chamber, wherein the engine operation in the first warm-up mode includes the step of repeatedly performing opening and closing of the intake throttle valve.

* * * * *